(12) United States Patent
Jacob et al.

(10) Patent No.: US 11,139,965 B2
(45) Date of Patent: Oct. 5, 2021

(54) BUILDING OR ENCLOSURE TERMINATION CLOSING AND/OR OPENING APPARATUS, AND METHOD FOR OPERATING A BUILDING OR ENCLOSURE TERMINATION

(71) Applicant: Hörmann KG Antriebstechnik, Steinhagen (DE)

(72) Inventors: Florian Jacob, Steinhagen (DE); Jörg Schmalenströer, Steinhagen (DE)

(73) Assignee: Hörmann KG Antriebstechnik, Steinhagen (DE)

( * ) Notice: Subject to any disclaimer, the term of this patent is extended or adjusted under 35 U.S.C. 154(b) by 103 days.

(21) Appl. No.: 16/343,905

(22) PCT Filed: Oct. 10, 2017

(86) PCT No.: PCT/EP2017/075859
§ 371 (c)(1),
(2) Date: Sep. 5, 2019

(87) PCT Pub. No.: WO2018/077610
PCT Pub. Date: May 3, 2018

(65) Prior Publication Data
US 2020/0007323 A1    Jan. 2, 2020

(30) Foreign Application Priority Data

Oct. 24, 2016  (DE) .................. 10 2016 120 262.2
Nov. 8, 2016   (DE) .................. 10 2016 121 376.4

(51) Int. Cl.
*H04L 9/08* (2006.01)
*G07C 9/28* (2020.01)
*H04L 9/32* (2006.01)
*H04W 12/08* (2021.01)
*H04W 12/041* (2021.01)
*H04W 12/61* (2021.01)

(52) U.S. Cl.
CPC .............. *H04L 9/0866* (2013.01); *G07C 9/28* (2020.01); *H04L 9/0894* (2013.01); *H04L 9/3242* (2013.01); *H04L 9/3247* (2013.01); *H04W 12/041* (2021.01); *H04W 12/08* (2013.01); *H04W 12/61* (2021.01)

(58) Field of Classification Search
None
See application file for complete search history.

(56) References Cited

U.S. PATENT DOCUMENTS

2002/0178385 A1* 11/2002 Dent ................. G07C 9/00309
                                                    726/27
2005/0179518 A1*  8/2005 Kawamura ........ G07C 9/00571
                                                    340/5.23
(Continued)

*Primary Examiner* — Brandon S Hoffman
(74) *Attorney, Agent, or Firm* — Studebaker & Brackett PC

(57) ABSTRACT

The invention relates to a building or enclosure termination opening and/or closing apparatus (10) having communication signed or encrypted by means of a key, and to a method for operating such. To allow simple, convenient and secure use by exclusively authorised users, the apparatus comprises: a first and a second user terminal (14, 30), with secure forwarding of a time-limited key from the first to the second user terminal being possible. According to an alternative, individual keys are generated by a user identification (42) and a secret device key (40).

20 Claims, 3 Drawing Sheets

(56) References Cited

U.S. PATENT DOCUMENTS

| | | | |
|---|---|---|---|
| 2013/0187756 A1* | 7/2013 | Fisher | G07C 9/00896 340/5.61 |
| 2014/0002236 A1* | 1/2014 | Pineau | G07C 9/00309 340/5.6 |
| 2014/0116084 A1* | 5/2014 | Bonnissel | C09K 5/041 62/611 |
| 2015/0143125 A1* | 5/2015 | Nix | H04L 9/0841 713/171 |
| 2016/0085955 A1* | 3/2016 | Lerner | G06F 21/725 726/20 |

* cited by examiner

BUILDING OR ENCLOSURE TERMINATION CLOSING AND/OR OPENING APPARATUS, AND METHOD FOR OPERATING A BUILDING OR ENCLOSURE TERMINATION

BACKGROUND

Technical Field

The invention relates to a building or enclosure termination opening and/or closing apparatus with a building or enclosure termination opening and/or closing device, which device comprises an actuator actuable by an actuation signal to allow or block access through a building or enclosure termination, a building or enclosure termination communication device for receiving and/or transmitting encrypted and/or signed messages, and an individual building or enclosure termination authentication device for each building or enclosure termination opening and/or closing device which initiates the actuation signal on receipt of a valid authentication code generated from one or more code keys, and with at least one first individual mobile user terminal which comprises a user terminal communication device for transmitting and/or receiving encrypted and/or signed messages, a memory for storing at least one individual user key, and an encryption device for encrypting and/or signing messages by means of the at least one individual user key. The invention also relates to a method for operating a building or enclosure termination opening and/or closing device comprising an actuator actuable by an actuation signal to open and/or close and/or to unlock or lock a building or enclosure termination, a building or enclosure termination communication device for receiving and/or transmitting encrypted and/or signed messages, and an individual authentication device for each building or enclosure termination opening and/or closing device which initiates the actuation signal on receipt of a valid authentication code generated from one or more code keys using at least a first individual mobile user terminal, which terminal comprises a user terminal communication device for receiving and/or transmitting encrypted and/or signed messages, a memory for storing at least one individual user key, and an encryption device for encrypting and/or signing messages with the at least one individual user key.

Background Art

Some examples of building or enclosure termination opening and/or closing devices (non-exhaustive) are gate drives, door drives, electric locks, motor locks and door openers such as front door openers. The building or enclosure termination opening and/or closing device is generally designed to secure a building or enclosure termination, in particular a door or gate, against unauthorized use and to permit use of the building or enclosure termination or actively initiate movement of a leaf of the building or enclosure termination upon receipt of a valid actuation signal.

Examples of user terminals are in particular mobile data processing devices such as smartphones, tablet computers or similar devices. The communication devices are particularly designed for wireless communication, specifically limited to short distances (less than 50 m, in particular less than 25 m). Preferably, the communication devices operate with a standard protocol. Particularly preferably, the communication devices are capable of communicating via Bluetooth, in particular via Low Energy Bluetooth (BLE).

SUMMARY

The invention particularly addresses the need of allowing access through building or enclosure terminations by authorized persons using standard user terminals such as smartphones or similar mobile data processing devices and corresponding application software (apps) without having to use separate individual devices such as mechanical keys, separate chips (RFID chips) or separate individual remote controls.

Locking systems that are known on the market and, for example, available on the market, such as those implemented by the companies of Danalock or Nuki for controlling locking systems, rely on a connection to a server that supports the authentication of a user. This restricts the possibility of use, as the locking system cannot be operated without an Internet connection. Other methods allow the locking system to be operated without an Internet connection, but the user group is limited to the maximum number of pairing partners (usually a maximum of 8 persons), and new users must be set up on site.

Electrical locking systems are security-critical elements in a building that should be armed against common attacks (e.g. replay attacks). Current studies show, however, that many devices available on the market are not safe.

Server-based locking procedures require an Internet connection during or shortly before the closing process, which on the one hand significantly limits the areas of application (due to lack of Internet access in cellars, gazebos or holiday homes) and on the other hand prevents the user from entering his own house in the event of a server failure. In addition, these approaches require significantly more powerful components. Some procedures require the presence of the owner at the gate for forwarding the access authorization and/or registration of a new user. This is not very convenient from the user's point of view and is hardly feasible in certain usage scenarios, e.g. for holiday homes.

Many procedures rely on secret key information that is the same in all products or even product groups of a manufacturer. This can endanger the security of an entire product group if a product is dismantled or if the manufacturer has a security gap (loss of data by employees or cyber attacks).

The object of the invention is to enable access through building or enclosure terminations, in particular doors and gates, in a simpler and more comfortable yet safe way and to limit access to a specific group of people.

To achieve this object, the invention provides the device and the method according to the attached independent claims.

Advantageous embodiments are the subject of subclaims.

According to one aspect, the invention provides a building or enclosure termination opening and/or closing apparatus with a building or enclosure termination opening and/or closing device, which device comprises an actuator actuable by an actuation signal to allow or block access through a building or enclosure termination, a building or enclosure termination communication device for receiving and/or transmitting encrypted and/or signed messages, and an individual building or enclosure termination authentication device for each building or enclosure termination opening and/or closing device which initiates the actuation signal on receipt of a valid authentication code generated from one or more code keys, and with at least one first individual mobile user terminal which comprises a user terminal communication device for transmitting and/or receiving encrypted and/or signed messages, a memory for storing at least one individual user key, and an encryption device for encrypting and/or signing messages with the at least one individual user key, wherein a) at least one second individual mobile user terminal is provided which comprises a user terminal communication device for transmitting and/or receiving encrypted and/or signed messages, a memory for storing at least one temporary user key, and an encryption device for encrypting and/or signing messages with the at least one temporary user key, wherein the first individual mobile user terminal is designed to receive or generate from user defaults a time limit message including information about a time limit for temporary authentication of a second user and to generate from the time limit message and from the individual user key a temporary user key that includes information about the individual user key and the time limit and to forward it to the at least one second individual mobile user terminal.

According to another aspect, the invention provides a building or enclosure termination opening and/or closing apparatus with a building or enclosure termination opening and/or closing device, which device comprises an actuator actuable by an actuation signal to allow or block access through a building or enclosure termination, a building or enclosure termination communication device for receiving and/or transmitting encrypted and/or signed messages, and an individual building or enclosure termination authentication device for each building or enclosure termination opening and/or closing device which initiates the actuation signal on receipt of a valid authentication code generated from one or more code keys, and with at least one first individual mobile user terminal which comprises a user terminal communication device for transmitting and/or receiving encrypted and/or signed messages, a memory for storing at least one individual user key, and an encryption device for encrypting and/or signing messages with the at least one individual user key, wherein b) the individual authentication device has an individual device key and a memory in which a user identification information for each first individual mobile user terminal is stored, wherein the authentication device is designed to calculate an individual user key for each first individual mobile user terminal from the device key and the user identification information by a unique code calculation, wherein the at least one first individual mobile user terminal is designed to receive, during a registration phase, its individual user key per individual authentication device and to store it in the memory.

Particularly preferably, the apparatus comprises both the features according to a) and the features according to b).

It is preferred that at least one second individual mobile user terminal is designed to encrypt messages with the temporary user key and optionally send the messages to the building and enclosure termination communication device via an encrypted channel.

It is preferred that the authentication device is designed to generate the individual user key from the user identification information and the device key upon receipt of a signed message, thereby verifying the message signed with the individual user key or the temporary user key generated by the individual user key.

It is preferred that the authentication device repeatedly generates a temporary public subkey valid for only a specified time period or action and sends it to a user terminal upon contact with the user terminal, the user terminal being adapted to sign messages with the user key and the subkey.

It is preferred that HMAC is used for signing.

It is preferred that the authentication device has a register in which the user identification information of first individual authorized users is registered.

It is preferred that the building or enclosure termination opening and/or closing apparatus is designed such that the registration of users by means of a first mobile user terminal is changeable or erasable or blockable or unblockable.

It is preferred that it is designed in such a way that registration of authorized users takes place by means of messages which are signed with a registration key which is to be entered or scanned into the first user terminal to be authorized and is stored in the authentication device. The authentication device transmits an individual user key encrypted with the registration key to the user terminal of the authorized user.

According to another aspect, the invention relates to a method for operating a building or enclosure termination opening and/or closing device, which device comprises an actuator actuable by an actuation signal to open and/or close and/or lock or unlock a building or closure termination, a building or enclosure termination communication device for receiving and/or transmitting encrypted and/or signed messages, and and an individual authentication device for each building or enclosure termination opening and/or closing device which initiates the actuation signal on receipt of a valid authentication code generated from one or more code keys using at least a first individual mobile user terminal which includes a user terminal communication device for transmitting and/or receiving encrypted and/or signed messages, a memory for storing at least one individual user key, and an encryption device for encrypting and/or signing messages with the at least one individual user key, the method comprising the following steps a1) to a6):

a1) providing at least one second individual mobile user terminal which comprises a user terminal communication device for transmitting and/or receiving encrypted and/or signed messages, a memory for storing at least one temporary user key, and an encryption device for encrypting and/or signing messages with the at lest one temporary user key, a2) receiving or generating a time limit message including information about a time limit for temporary authentication of a second user by means of the first mobile user terminal, a3) generating a temporary user key from the time limit message and the individual user key, the temporary user key including information about the individual user key and the time limit, a4) forwarding the temporary user key from the first individual user terminal to the at least one second individual mobile user terminal, and a5) generating an individual temporary authentication code from the temporary user key by the second user terminal, so that the temporary authentication code includes information about the individual user key and the time limit, and a6) initiating the actuation signal by the authentication device if a temporary authentication code which corresponds to a valid individual user key is received within a valid period of time determined by the time limit.

According to another aspect, the invention provides a method for operating a building or enclosure termination opening and/or closing device, which device comprises an actuator actuable by an actuation signal to open and/or close or lock and/or unlock a building or closure termination,
a building or enclosure termination communication device for receiving and/or transmitting encrypted and/or signed messages, and
an individual authentication device for each building or enclosure termination opening and/or closing device which initiates the actuation signal on receipt of a valid authentication code generated from one or more code keys using at least a first individual mobile user terminal which includes a user terminal communication device for transmitting and/or receiving encrypted and/or signed messages, a memory for storing at least one individual user key, and an encryption device for encrypting and/or signing messages with the at least one individual user key, the method comprising the following steps:

b1) registration of user identification information for each authorized user who uses a first individual user terminal,
b2) calculating an individual user key per authorized user by means of a secret device key assigned to the individual authentication device and the assigned user identification information by a unique code calculation routine, and
b3) transmitting the individual user key to the assigned first individual mobile user terminal in the course of a registration phase. It is preferable to encrypt the individual user key with the registration key.

Preferably, the method comprises:
Receiving a message signed with an individual or temporary user key via the building or enclosure termination communication device,
calculating the individual user key from the user identification information and the device key, and
verifying the message by means of the calculated individual user key.

In a preferred embodiment, the method comprises steps a1) to a6) and also steps b1) to b3).

Identifying the steps and features by a), b), a1), a2), b1), b2) is merely for easy reference and shall not be construed as a limitation to any particular order or preference of the steps and features so identified.

Preferably, the method comprises:
Generating a temporary public subkey valid for a specified period or for a specified action and notifying the temporary public subkey at the time of or before a contact between the communication devices, and
signing messages with the user key and the subkey and repeating these steps with a new temporary subkey after the period has expired or the action has been completed.

Preferably, the method comprises:
Signing by means of HMAC. SHA256 is preferably used to calculate HMAC signatures.

Preferably, the method comprises:
Communication via Bluetooth.

Preferably, the method comprises:
Registering the user identification information of all first individual authorized users in a register of the authentication device.

Preferably, the method comprises:
Changing, removing, blocking or unlocking user registrations by means of a first mobile user terminal.

Preferably, the method comprises:
Registering authorized users via messages signed with a registration key that has to be entered or scanned into the first user terminal to be authorized and that is stored in the authentication device.

According to another aspect, the invention relates to a computer program with program code means stored, in particular, on a machine-readable carrier and adapted to carry out the method according to one of the above-mentioned embodiments when the computer program is run on a terminal device. Preferably, this is an app that can be loaded to a preferably Bluetooth-enabled smartphone.

Preferably, the building or enclosure termination opening and/or closing apparatus is configured to carry out the method according to one of the above-described embodiments. Preferred configurations of the method are implementable on a building or enclosure termination opening and/or closing apparatus according to one of the above-described embodiments.

A preferred embodiment of the invention relates in particular to time-limited key forwarding.

A preferred embodiment of the invention relates to key forwarding for forwarding a time-limited code key for opening/closing building or enclosure terminations from a first individual user to a user who is to be accepted for a limited period of time by the authentication unit.

Preferably, key forwarding takes place between the authentication unit and the terminal of the first users on the basis of a Low Energy Bluetooth connection and the key forwarding of time-limited keys via third communication paths (QR codes, email, short messages).

In particular, an actuator configured to open/close or lock/unlock a building or enclosure termination and actuable by an actuation signal is connected to a Bluetooth Low Energy device that initiates the actuation signal on receipt of a valid key (authentication code).

According to another preferred embodiment, the invention relates to a method for the forwarding of time-limited keys for a Bluetooth Low Energy-based closing procedure for gates and doors.

Particularly preferred embodiments of the invention have the following advantages: A Bluetooth Low Energy radio chip can be used to open and close gates and doors. The owner is advantageously able to provide other persons with permanent or time-limited access to a room or building. This access control preferably works independently of an Internet connection. Due to its independence from the Internet, the device can be used at any desired location (cellars, forest huts, holiday homes, gazebos, sheds, storerooms, remote enclosures, etc.). Access control may be limited in memory and computing power for cost reasons. Nevertheless, preferably large user groups with more than 100 persons can be supported. The forwarding of keys to third persons is preferably possible over large distances (e.g. via short message or telephone), whereas the closing process itself is preferably possible without an Internet connection.

Preferred embodiments of the invention use inexpensive hardware components and apply cryptographic methods known in other fields such as communications engineering or information technology for data encryption to enable very large user groups to access buildings, rooms or enclosures for a limited period of time. This results in good scalability of the application scenarios (e.g. private house, commercial property, hotel complex, enclosure, holiday accommodation).

Preferred embodiments of the method according to the invention do not have high memory requirements because only very little information needs to be stored on the respective device itself (especially on the communication and authentication device assigned to the building oder enclosure termination). In a preferred configuration, the computational complexity is low due to the use of hash functions.

Preferably, only one hash function is required, and no public-private-key procedures need to be performed, which are arithmetically much more complex.

In a preferred embodiment, the security of each device (especially of each stationary communication and authentication device) is based on a secret (device key or device code; individually for each device, unknown to the manufacturer) that is preferably randomly determined by hardware. Thus, it will not be possible to compromise the safety of one device by disassembling/analyzing another device or bypass the security of the manufacturer by stealing data.

Preferably, the method deliberately does not use manufacturer-specific keys as a secret and uses individually generated, especially hardware-generated, random numbers for all procedures.

Preferably, the method allows individual blocking of assigned keys or user groups by privileged users. This allows to minimize security risks due to loss of keys.

Preferably, a privileged user who wants to grant another person access to the system does not have to visit the locking system, but can generate a time-limited key at any location and at any time and pass it on to the person. However, a person with a temporary key cannot use this key to grant access to other persons. Preferably, it can therefore be seen transparently at any time which person has granted whom access to the system.

Preferably, a control (implementing the method) can be implemented on an embedded processor of an nrf52 chip, and there is even room for additional control components, which means that other components and component groups can be saved.

This approach allows novel functions for controlling gates and doors which exceed current approaches using remote control.

A design of a compact circuit with few components is possible and thus allows integration into a door frame.

The functional range of particularly preferred configurations includes the forwarding of keys, the ability to handle large user groups with low hardware requirements and/or device-specific secrets.

BRIEF DESCRIPTION OF THE DRAWINGS

One embodiment of the invention will be described in more detail in the following with reference to the attached drawings wherein it is shown by.

DETAILED DESCRIPTION

Figure 1:
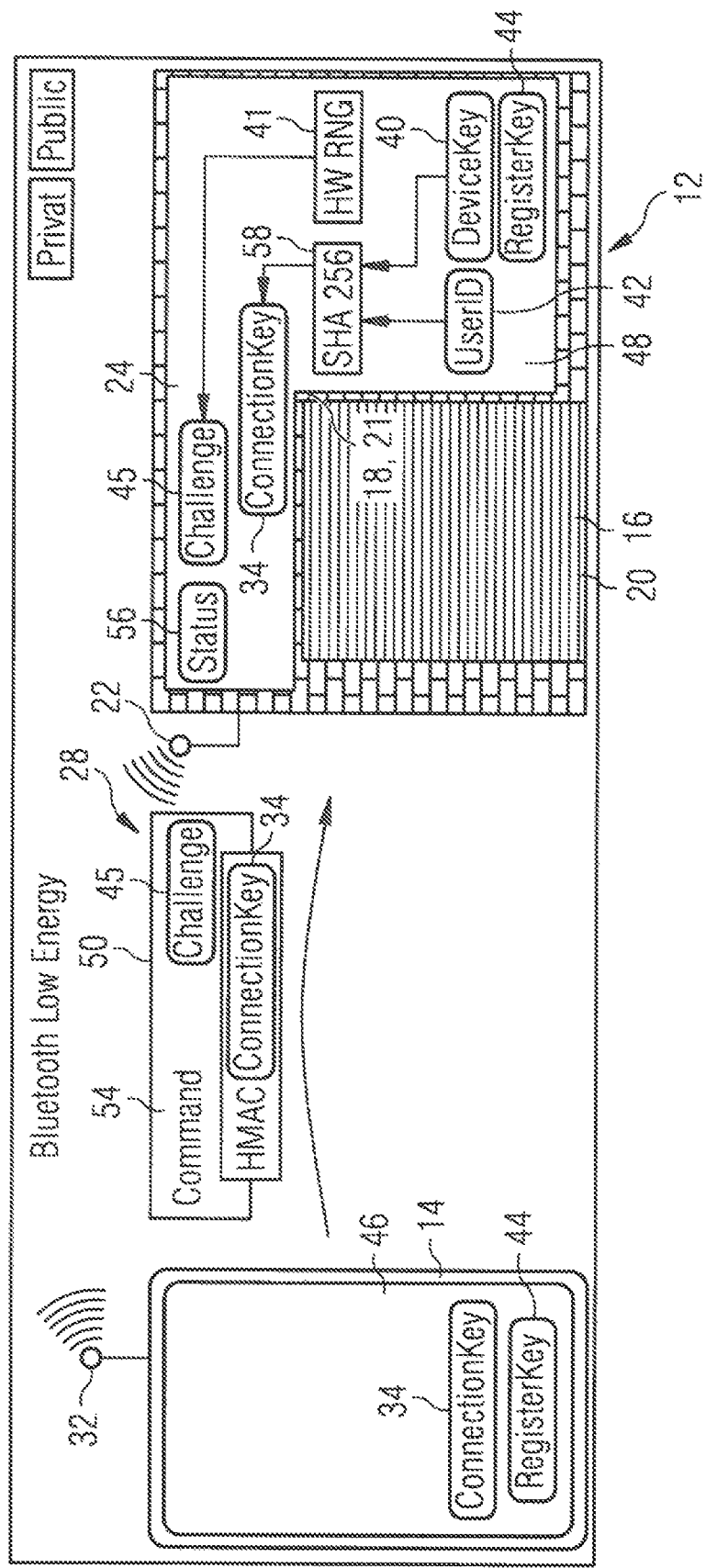
FIG. 1 a schematic block diagram of one embodiment of a building or enclosure termination opening and/or closing apparatus using the example of a gate control that can be actuated in this case using a HMAC-signed code.
Figure 2:
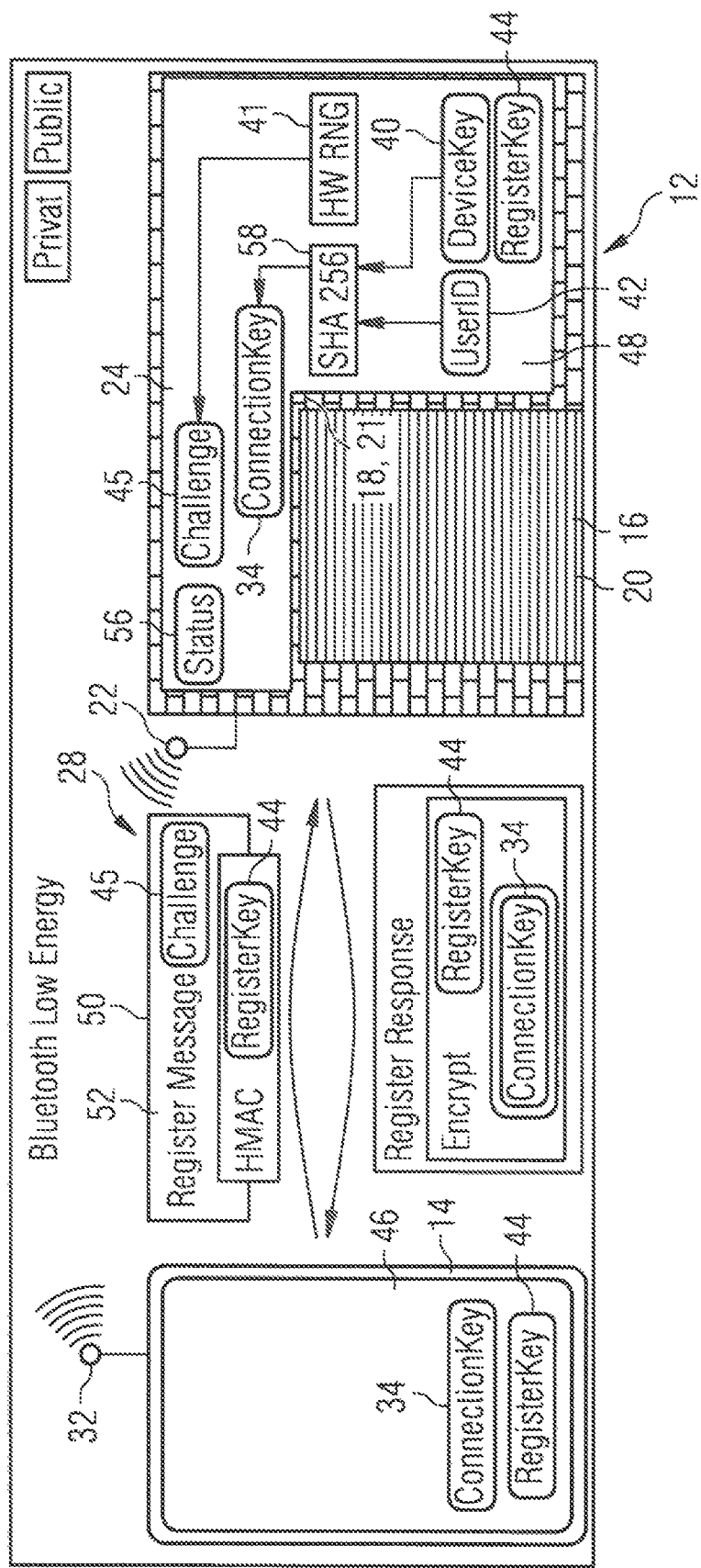
FIG. 2 a schematic block diagram of the embodiment of FIG. 1 showing a registration process.
Figure 3:
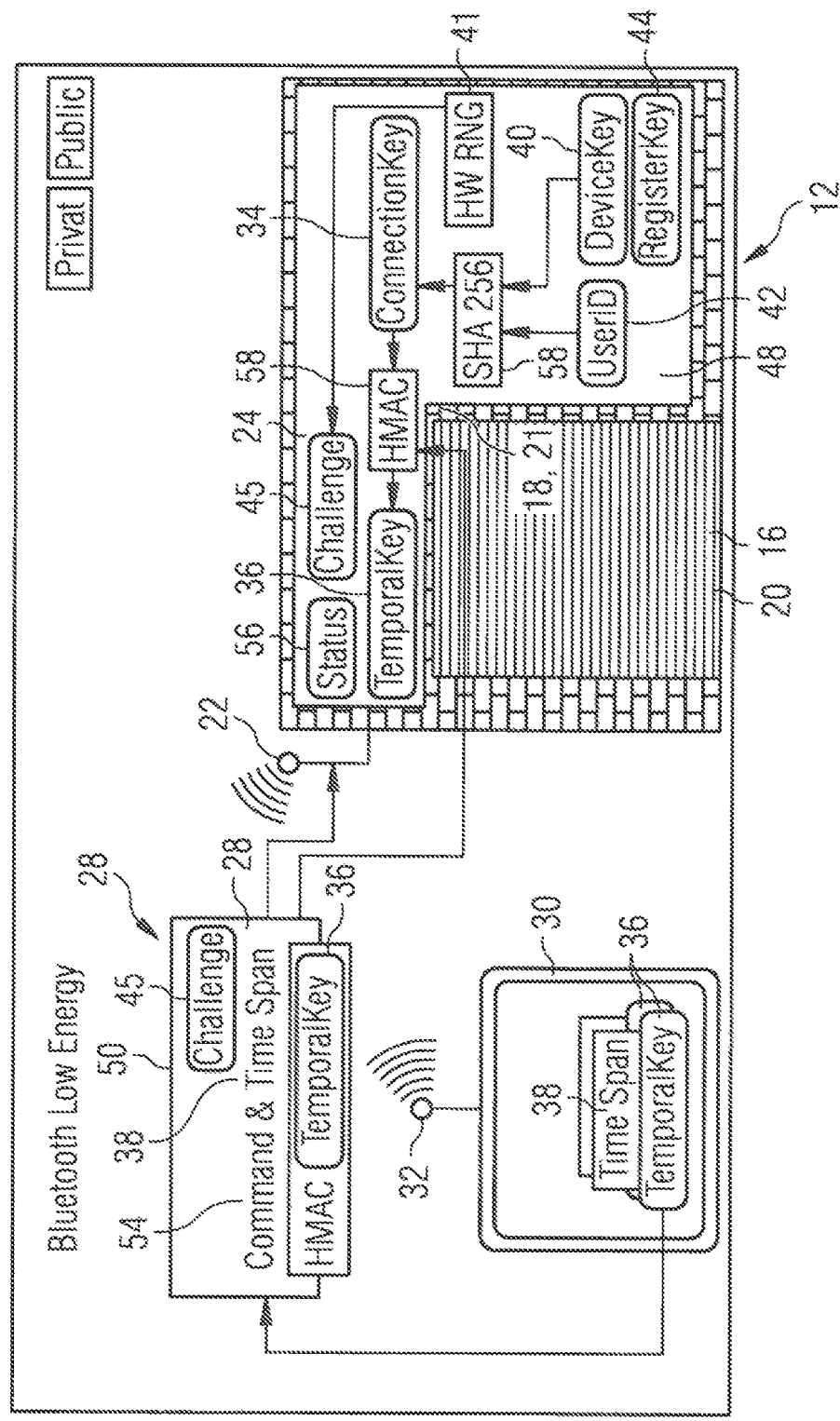
FIG. 3 a schematic block diagram of the embodiment of FIG. 2 showing an interaction between a non-privileged user (such as in particular a user with time-limited authentication) and the building or enclosure termination, in the present case the gate.

FIGS. 1 to 3 show one embodiment of a building or enclosure termination opening and/or closing apparatus 10 during different operating phases. In FIG. 1, normal operation is shown in which an authorized user (i.e. a register user, presently also called "privileged user") performs an authorized operating procedure such as, for example, opening or closing an automatic gate. FIG. 2 shows a registration phase for registering authorized users. FIG. 3 shows how another user, who has been temporarily authorized by an authorized privileged user to operate the gate, performs an operating procedure.

The building or enclosure termination opening and/or closing apparatus 10 comprises a building or enclosure termination opening and/or closing device 12 and at least a first individual mobile user terminal 14.

Building or enclosure termination opening and/or closing device 12 is understood to mean a device by means of which access through a building closure or an enclosure termination 16 can be released or blocked in a signal-activated manner. Examples are gate operators or door operators or gate openers or door openers or electric locks or motor locks. In the illustrated examples, a door drive 18 for driving a building closure 16 designed as a gate 20 is shown in particular.

The building or enclosure termination opening and/or closing device 12 comprises an actuator 21 that can be actuated by an actuation signal to allow or block access through the building or enclosure termination 16, a building or enclosure termination communication device 22 for receiving and/or transmitting encrypted and/or signed messages, and an individual building or enclosure termination authentication device 24 for each building or enclosure termination opening and/or closing device 12 which initiates the actuation signal on receipt of a valid authentication code 28 generated from one or more code keys.

In the illustrated embodiment, the motor of the door drive 18, for example, forms the actuator 21. In the case of a door opener, the actuator, for example, can be formed by a solenoid that unlocks a door so that the door can be opened by pulling or pushing.

The at least one first individual mobile user terminal 14 is a user terminal owned by the registered user. Examples of user terminals 14, 30 explained here are in particular mobile data processing devices such as DPAs, tablet computers and especially preferably smartphones. User terminals owned by registered users are referred to as first user terminals 14. The registered users can temporarily authorize other users to operate the device by transmitting temporary keys (TemporalKey) from their first user terminal 14 to a user terminal owned by these temporary users. The user terminals of the users to be authorized only temporarily are referred to as second mobile user terminals 30 here.

The user terminals 14, 30 each have a user terminal communication device 32 for transmitting and/or receiving encrypted and/or signed messages and a memory 34 for storing at least one user key 34, 36 and an encryption device for encrypting and/or signing messages with the at least one user key 34, 36. The first user terminals 14 use individual user keys 34 for this purpose which are specifically for the individual first mobile user terminal 14 and for the respective building or enclosure termination to be operated, i.e. for the authentication device 24 assigned to it. The individual user keys 34 are used as individual secrets for connection between the respective individual first mobile user terminals 14 and the individual authentication devices 24 and are therefore also referred to as ConnectionKey 24 in the following.

The second user terminals 30 use temporary user keys 36 for signing that contain information about the registered user who initiated the temporary authorization and about the time limit (Time Span) 38.

Accordingly, there is provided at least one second individual mobile user terminal 30, which also includes a user terminal communication device 32 for transmitting and/or receiving encrypted and/or signed messages and a memory for storing at least one temporary user key 36 and an encryption device for encrypting and/or signing messages with the at least one temporary user key 36, the first individual mobile user terminal 14 being designed for receiving a time limit message including information about a time limit for temporary authentication of a second user or for generating such a time limit message from user defaults and for generating a temporary user key 36, which contains information about the individual user key 36 and the time limit 38, from the time limit message and the individual user key and forwarding it to the at least one second individual mobile terminal 30.

In the illustrated embodiment, the user terminal communication device 32 is formed, for example, by the Bluetooth installation of the smartphone. The encryption device is implemented by application software (e.g. App).

The individual authentication device 24 has an individual device key 40—also called DeviceKey in the following— and a memory or register in which user identification information (UserID) 42 for each first individual mobile user terminal 14 is stored.

The authentication device 24 and building or enclosure termination communication device 22 are implemented on a BLE chip, for example. This chip includes in particular a processor, application software, a random generator 41 (in particular hardware-implemented, HW RNG), and a Bluetooth interface for low-energy Bluetooth connection.

The authentication device 24 is designed for calculating an individual user key 34 for each first individual mobile user terminal 14 from the device key 40 and the user identification information 42 by unique code calculation.

The at least one first individual mobile user terminal 14 is designed to receive and to store in its memory its individual user key 34 for each individual authentication device 24 during a registration phase.

Registration is carried out by signing with a registration key (RegisterKey) 44 which is contained in accompanying documents, for example, and can be entered by the owner into the first user terminal to be registered, or can be scanned using a scan code, for example.

In order to prevent replay attacks, the authentication device 24 is further designed to generate a subkey 45 which is only valid temporarily for a period of time or an action (an operating procedure or also a sequence of operating procedures) and which is made available to the other devices 14, 30 designed for communication and is also used for signing the messages. One example of such a subkey 45 is called "Challenge" in the following description.

In the following, one execution example is explained in detail using the representations in FIGS. 1 to 3. In the Figures, public information (Public) and private information (Private) are marked with different colors or symbols.

1.0 Security Concept for Key Forwarding

In the following, the components and procedures for key generation and forwarding will be described in detail and the procedure steps provided for this will be explained.

The operation is carried out by communication between the communication devices 22, 32 using messages signed and/or encrypted with code keys 34, 36, 44, 45.

1.1. General data format: A message (Packet) consists of a Header ("Header"), an optional/variable data section ("Data") and an authentication code 28, in particular in the form of a signature 50, preferably an HMAC signature, even more preferably a 32-byte signature. These messages are sent from a smartphone 46 (one example of the user terminal 14, 30) to the BLE device 48 (one example of the building or enclosure termination opening and/or closing device 12, e.g. door control) to either exchange data or transmit commands. The purpose of signature 50 is to secure the communication with regard to modifications by third parties and to authenticate the command of the smartphone 46 to the BLE device 48. The signature (Message Authentication Code) 50 relies on a HMAC process. HMAC signatures are particularly preferred examples of the authentication code used here.

Details on the HMAC procedure can be found in particular in Wikipedia, keyword "Keyed-Hash_Message_Authentification", downloaded on Oct. 19, 2016 and attached to the application as non-patent literature.

1.2 Message Authentication Code: The security of the building or enclosure termination control, such as door control or gate control in particular, uses "Message Authentication Codes" to verify the user to gate 20. To keep the designations short, the "Message Authentication Code" 28 is referred to below as signature 50. For this purpose, the user sends the header containing the command 54 to be executed and signs it using HMAC (Keyed-Hash Message Authentication Code). HMAC is specified in RFC 2104, NIST Standard FIPS 198, and RFC 4868. It is used in IPSEC, TLS and SSH and is currently considered secure and not compromised. The signature 50 is calculated by means of HMAC=HASH((ConnectionKey xor opad)||HASH((ConnectionKey xor ipad)||(Message Challenge))), wherein describes "||" the concatenation operation and "HASH" the sha256 hash function. The paddings opad and ipad are to be taken from the standards.

The common secret between the communication partners smartphone and gate control is the ConnectionKey (example of an individual user key 34) that has to be kept secret. If the smartphone 46 passes on the key, any other person can open the door/gate 20 with it. The digital ConnectionKey thus behaves like a physical key to a conventional lock.

1.3 ConnectionKey: The ConnectionKey (individual user key 34) is created by combining the device-specific key DeviceKey (device key 40) and the user identification number UserID (example for user identification information 42). The concatenation of both pieces of information and the subsequent performing of a hash function provide the ConnectionKey. The BLE chip generates a random, device-specific device key 40, "DeviceKey", fat a defined point in time (alternatively during assembly), which is only stored on the device 48 and is never delivered. Each new user receives a unique identifier, e.g. a 16-bit identifier (UserID) during registration. The BLE chip determines a ConnectionKey by means of sha256: ConnectionKey=SHA256(UserID II DeviceKey).

The ConnectionKey is only stored on the smartphone 46, but not on the BLE chip. The smartphone 46 provides enough memory to store a large number of keys, but the BLE chip has only limited memory space, so it is advantageous to generate a derived key from a master key.

Advantages of the process and objectives:

Key expansion from short UserID to long 256-bit "Connection Key"

No global keys are exchanged

Each participant has an individual user key 34 (e.g. 256-bit key), which cannot be used to calculate the keys of other participants. Assuming a user knows his own "ConnectionKey", he cannot calculate the corresponding DeviceKey, because for that he would have to reverse the sha256 function. Without the "DeviceKey" he cannot calculate the keys of the other users.

Memory saving: The BLE chip does not have to store all keys, but can calculate them at any time from the UserID.

Deletion/blocking of UserIDs using blocking lists with reduced memory requirements Blocking all keys by newly generating the DeviceKey 1.4 Removing or Blocking Users Users are blocked via lists and the replacement of keys.

2.1 Registration Process a) "Privileged Users" (registered users, owners of first user terminals 14):

The list "RootUsers" contains all UserIDs of privileged users. UserIDs are assigned to RootUser in ascending order. As soon as the capacity of the list is or the possible UserIDs are exhausted (in case of 16 bit, the list is exhausted when the UserIDs have reached 65535 users), no new privileged users can be created in the system. Old UserIDs are not released until a new "DeviceKey" has been generated. As a result, all previously assigned keys expire and all users must be newly registered in the system. A privileged user is blocked by removal from the "RootUsers" list. The removal or deletion of a privileged user automatically blocks all time-limited keys that were generated using the blocked key or are generated abusively at a later point in time. All privileged users are authorized to do this.

b) "Non-Privileged Users":

The blocking list "BlockedUsers" contains combinations of UserID and TemporalKey and characterizes the users to be blocked via the ID of the privileged user allowing access and the TemporalKey number (single key or key group).

Every user on the list "BlockedUsers" is automatically blocked. Each privileged user may block or unblock each privileged user. In addition, each privileged user can block the non-privileged users signed with his key while it is possible on the other hand to unblock non-privileged users who were not signed with one's own key.

2.2 DeviceKey

Each device 48 independently generates a random device key 40, in particular a 256-bit DeviceKey. This DeviceKey will never leave the device 48 and is "hardware-based" random. The random numbers can be obtained from a suitable source (e.g. BLE stack, external hardware). In an advantageous design, the use of pseudo-random values or values calculated from other information (e.g. the product number) is not permitted, since a weakening of the "DeviceKey" would weaken the security of the entire system. The ConnectionKey is derived from this DeviceKey.

2.3 Challenge (Example of Subkey 45)

The BLE chip randomly throws values for a subkey 45, such as a 32-bit Challenge, and makes them publicly available to each device 14, 30 via a notification. Here pseudo-random values can be used. In this execution example, each command must contain the current Challenge information for calculating the signature in order to effectively prevent replay attacks. In one execution example, each state change of the system (e.g. open, close) automatically generates a new Challenge. In order to economize the amount of data to be transferred, the Challenge is preferably not part of a package.

2.4 RegisterKey (Example of Registration Key 44)

The "RegisterKey" is the access to the system of registration of privileged users. The owner (in the sense of the product purchaser) should avoid passing on the "RegisterKey" and only provide this information to a very trustworthy group of persons. A person in possession of the "RegisterKey" can generate random privileged users and these can in turn generate "non-privileged" users.

The use of the "RegisterKey" can be as follows:

1. "Owner-centered": The owner has sole knowledge of the "RegisterKey". He/she generates all keys 34 for privileged users and provides the keys 34 via a secure server infrastructure.

2. "Group": The "RegisterKey" is provided to a trusted group, which can use the registration key 44 in any way. In case of misuse, the device 48 must be reset and the "RegisterKey" changed.

In the case of a compromised key secret, a PIN/PUK procedure can be used to change the "RegisterKey". The PIN/PUK information should be stored separately from the device 48 and should only be used to change the "RegisterKey".

3.1 Registration Process of Privileged Users

The aim of the registration process is the login of a privileged user (root) via an optionally encrypted and MITM-secured (MITM=Man-In-The-Middle) connection. In this case, a 128-bit AES encryption can be used by the Bluetooth stack. The MITM security is realized by the protocol. The registration follows e.g. the following protocol:

1. Smartphone 48 (as a first individual user terminal 14) scans for BLE chip
2. Smartphone 48 connects to BLE chip
3. BLE chip has secret RegisterKey (when delivered in text form or as QR code noted in the operating instructions; alphanumerical; >128 bit)
4. Smartphone 48 sends registration message (Register Message) 52:
   Data: User name (alphanumerical, e.G. "Mustermann", length 10 characters)
   Signature=HASH((RegisterKey xor opad)||HASH((RegisterKey xor ipad)||(Message||Challenge)))
   BLE chip verifies signature and saves new user if successful (UserID++) UserID=unique user number as number (16 bit) ConnectionKey=SHA256(UserID||Device Key)
6. BLE chip encrypts [ConnectionKey] by hashing the RegisterKey: EncConnectionKey=ConnectionKey xor HASH(RegisterKey)
7. BLE chip sends [UserID, EncConnectionKey] to smartphone via encrypted connection.
8. Smartphone decrypts secret connection key [ConnectionKey] by ConnectionKey=EncConnectionKey xor HASH(RegisterKey).

Note: The connection between BLE chip 48 and Smartphone 46 cannot be reliably protected against MITM attacks in most cases, but the use of the RegisterKey can considerably increase the effort for determining the Connection Key. The use of a 256-bit key is recommended.

4.1 Key Forwarding Via Signature Chain

Any privileged user may grant access to other persons. A time limit must be set. If a privileged user loses access to the system, all derived keys automatically become invalid.

The aim of the protocol described below is to generate a time-limited key (temporary user key 36) or chain of keys and exchange it between a privileged user ("Root") and a non-privileged user ("User").

1. Root smartphone generates a message that combines the time limit message, the GroupID and the UserID in one message and calculates the related signature. The signature then gets the role of a temporary user key 36 ("TemporalKey") for the non-privileged user. The non-privileged user uses the TemporalKey as a ConnectionKey to sign his own door/gate control commands. The TemporalKey cannot be used to calculate the ConnectionKey of the Root user. If a user is to be granted access for repeated periods of time, a separate key is calculated for each period and all keys are combined in a key chain. TemporalKey=HASH((Connection Key xor opad)||HASH((Connection-Key xor ipad)||(Message))).

2. Root smartphone sends the key chain, which represents a lot of combinations [Message, TemporalKey], to the non-privileged user over a secure channel. Each temporary user key 36 is valid for a limited period of time [StartTime, EndTime], repeating periods are defined individually.

3. Door/gate control by privileged or non-privileged users: The smartphone of the temporary user (example for the second user terminal 30) scans for advertisement packages of the gate 20 known to it. As soon as data of a gate 20 known to it are displayed, the app software extracts relevant data on the status from the advertisement package (e.g. current Challenge). If the user wishes to interact with gate 20, he presses a corresponding button/symbol. The smartphone 30 then connects to the BLE device 48, which stops the advertisement. The optional 128-bit encrypted connection now transfers the packets from the smartphone 30 to the BLE device 48. The user uses the TemporalKey of the currently valid temporary user key 36 to sign his messages, e.g. opening the gate. The Challenge integration prevents replay attacks.

Signature=HASH((TemporalKey xor opad)||HASH((TemporalKey xor ipad)||Message||Challenge))).

4. Smartphone 30 of the non-privileged user sends message to BLE device 48

5. BLE device 48 checks Time Span & Challenge; if one of them does not meet the expectations, the systems ignores the request 6. BLE device 48 independently calculates the TemporalKey using the ConnectionKey of the privileged user known to it who allegedly granted access to the non-privileged user. It then verifies the signature and opens the gate if necessary.

LIST OF REFERENCE SIGNS

10 building or enclosure termination opening and/or closing apparatus
12 building or enclosure termination opening and/or closing device
14 first user terminal (registered, privileged user)
16 building closure or enclosure termination (e.g. gate, door)
18 door drive
20 gate
21 actuator
22 building or enclosure termination communication device
24 authentication device
28 authentication code (signed message)
30 second user terminal (only temporarily authorized user)
32 user terminal communication device
34 individual user key (ConnectionKey, registered user)
36 temporary user key (TemporalKey, temporary user)
38 information about time limit (Time Span) of temporary permission for use
40 device key (DeviceKey)
41 random generator
42 user identification information (UserID)
44 registration key
45 subkey (Challenge)
46 smartphone
48 BLE device
50 signature
52 registration message
54 command (Command)
56 status
58 code calculation routine (encryption or signature)

The invention claimed is:

1. A building or enclosure termination opening and/or closing apparatus comprising:
a building or enclosure termination opening and/or closing device comprising
an actuator that can be actuated by an actuation signal to allow or block access through a building or enclosure termination,
a building or enclosure termination communication device configured to receive and/or transmit encrypted and/or signed messages, and
an individual authentication device for each building or enclosure termination opening and/or closing device which initiates the actuation signal on receipt of a valid authentication code generated from one or more code keys, and
at least one first individual mobile user terminal which comprises a user terminal communication device configured to transmit and/or receive encrypted and/or signed messages, a memory configured to store at least one individual user key, and an encryption device configured to encrypt and/or sign messages with the at least one individual user key,
wherein the individual authentication device has an individual device key and a memory in which a user identification information for each first individual mobile user terminal is stored,
wherein the authentication device is configured to calculate an individual user key for each first individual mobile user terminal from the individual device key and the user identification information by a unique code calculation, wherein the at least one first user terminal is configured to receive, during a registration phase, its individual user key per individual authentication device and to store the received individual user key in the memory, and
wherein the first individual mobile user terminal is configured to use at least one temporary user key to temporarily authenticate the at least one second individual mobile user terminal.

2. The building or enclosure termination opening and/or closing device according to claim 1, wherein the authentication device repeatedly generates a temporary subkey which is valid only for a specific period of time or a specific action and sends the temporary subkey to a user terminal upon contact with the latter, the user terminal being designed to sign messages with the user key and the subkey.

3. The building or enclosure termination opening and/or closing device according to claim 1, wherein the messages are signed by HMAC.

4. The building or enclosure termination opening and/or closing apparatus according to claim 1, wherein the authentication device comprises a register in which the user identification information of authorized users is registered.

5. The building or enclosure termination opening and/or closing apparatus according to claim 4, wherein the registration of users is changeable or removable, or blockable or unblockable, by the first mobile user terminal.

6. The building or enclosure termination opening and/or closing apparatus according to claim 1, wherein registration of authorized users takes place by messages which are signed with a registration key which is to be entered or scanned into the first user terminal to be authorized and is stored in the authentication device.

7. The building or enclosure termination opening and/or closing apparatus according to claim 1, wherein
the at least one second individual mobile user terminal comprises a user terminal communication device configured to transmit and/or receive encrypted and/or signed messages, a memory configured to store the at least one temporary user key, and an encryption device configured to encrypt and/or sign messages with the at least one temporary user key, and
wherein the first individual mobile user terminal is configured to receive or to generate from user defaults information about a time limit for temporary authentication of a second user and to generate from that information about the time limit and from the individual user key a temporary user key that includes information about the individual user key and the time limit and to forward the temporary user key to the at least one second individual mobile user terminal.

8. The building or enclosure termination opening and/or closing apparatus according to claim 7, wherein at least one of the following:
the at least one second user terminal is configured to encrypt messages using the temporary user key and send the messages encrypted to the building or enclosure termination communication device, and
the authentication device is configured to generate the individual user key from the user identification information and the individual device key on receipt of a signed message and to use the individual user key to verify the message signed with the individual user key or with the temporary user key generated by the individual user key with regard to the authenticity and authorization of the user.

9. A method for operating a building or enclosure termination opening and/or closing device,
the building or enclosure termination opening and/or closing device comprises
an actuator that can be actuated by an actuation signal to allow or block access through a building or enclosure termination,
a building or enclosure termination communication device configured to receive and/or transmit encrypted and/or signed messages, and
an individual authentication device for each building or enclosure termination opening and/or closing device which initiates the actuation signal on receipt of a valid authentication code generated from one or more code keys, and
the building or enclosure termination opening and/or closing device uses at least one first individual mobile user terminal which comprises a user terminal communication device configured to transmit and/or receive encrypted and/or signed messages, a memory configured to store at least one individual user key, and an encryption device configured to encrypt and/or sign messages with the at least one individual user key, and the method comprises
registering a user identification information for each authorized user who uses a first individual user terminal;
calculating an individual user key per authorized user by means of a secret device key assigned to the individual authentication device and the assigned user identification information using a unique code calculation routine;
transmitting the individual user key to the assigned first individual mobile user terminal in the course of a registration phase; and
operating the first individual mobile user terminal to use at least one temporary user key to temporarily authenticate the at least one second individual mobile user terminal.

10. The method according to claim 9, further comprising:
receiving a message signed with an individual or temporary user key via the building or enclosure termination communication device,
calculating the individual user key from the user identification information and the secret device key, and
verifying the sender and/or content of the message by the calculated individual user key.

11. The method according to claim 10, further comprising:
generating a temporary subkey which is valid for a specified time period or a specified action,
notifying the temporary subkey at the time of or before a contact between the communication devices,
signing messages with the user key and the subkey, and
repeating at least the generating with a new temporary subkey after the time period has expired or the action been completed.

12. The method according to claim 10, wherein HMAC is used to sign the messages.

13. The method according to claim 9, further comprising:
generating a temporary subkey which is valid for a specified time period or a specified action,
notifying the temporary subkey at the time of or before a contact between the communication devices,
signing messages with the user key and the subkey, and
repeating at least the generating with a new temporary subkey after the time period has expired or the action been completed.

14. The method according to claim 9, wherein HMAC is used to sign the messages.

15. The method according to claim 9, wherein communication by the communication device occurs via Bluetooth.

16. The method according to claim 9, further comprising registering the user identification information of all authorized users in a register of the authentication device.

17. The method according to claim 9, further comprising changing, removing, blocking or unblocking user registrations by the first mobile user terminal.

18. The method according to claim 9, further comprising registration of authorized users by messages signed with a registration key that is entered or scanned into the first user terminal to be authorized and is stored in the authentication device.

19. The method according to claim 9, further comprising:
providing the at least one second individual mobile user terminal which comprises a user terminal communication device configured to transmit or receive encrypted and/or signed messages, a memory configured to store the at least one temporary user key, and an encryption device configured to encrypt and/or sign messages with the at least one temporary user key;

receiving or generating information about a time limit for temporary authentication of a second user by the first mobile user terminal;

generating a temporary user key from the time limit information and the individual user key, the temporary user key including information about the individual user key and the time limit;

forwarding the temporary user key from the first user terminal to the at least one second user terminal;

generating an individual temporary authentication code from the temporary user key by the second user terminal, so that the temporary authentication code includes information about the individual user key and the time limit; and initiating the actuation signal by the authentication device if a temporary authentication code which corresponds to a valid individual user key is received within a valid period of time determined by the time limit.

20. A computer program with program code stored on a machine-readable storage, installed to carry out a method for operating a building or enclosure termination opening and/or closing device when the computer program is run on a terminal, the building or enclosure termination opening and/or closing device comprises an actuator that can be actuated by an actuation signal to allow or block access through a building or enclosure termination, a building or enclosure termination communication device configured to receive and/or transmit encrypted and/or signed messages, and an individual authentication device for each building or enclosure termination opening and/or closing device which initiates the actuation signal on receipt of a valid authentication code generated from one or more code keys, and the building or enclosure termination opening and/or closing device uses at least one first individual mobile user terminal which comprises a user terminal communication device configured to transmit and/or receive encrypted and/or signed messages, a memory configured to store at least one individual user key, and an encryption device configured to encrypt and/or sign messages with the at least one individual user key, and the method comprises registering a user identification information for each authorized user who uses a first individual user terminal;

calculating an individual user key per authorized user by means of a secret device key assigned to the individual authentication device and the assigned user identification information using a unique code calculation routine;

transmitting the individual user key to the assigned first individual mobile user terminal in the course of a registration phase; and operating the first individual mobile user terminal to use at least one temporary user key to temporarily authenticate the at least one second individual mobile user terminal.

\* \* \* \* \*